United States Patent
Qian et al.

(10) Patent No.: US 9,014,568 B2
(45) Date of Patent: Apr. 21, 2015

(54) NEXT GENERATION OPTICAL ACCESS NETWORK WITH CENTRALIZED DIGITAL OLT

(71) Applicant: NEC Laboratories America, Inc., Princeton, NJ (US)

(72) Inventors: Dayou Qian, Princeton, NJ (US); Ting Wang, West Windsor, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 140 days.

(21) Appl. No.: 13/768,487

(22) Filed: Feb. 15, 2013

(65) Prior Publication Data

US 2014/0056585 A1 Feb. 27, 2014

Related U.S. Application Data

(60) Provisional application No. 61/599,696, filed on Feb. 16, 2012.

(51) Int. Cl.
| | |
|---|---|
| *H04B 10/00* | (2013.01) |
| *H04B 10/04* | (2006.01) |
| *H04B 10/06* | (2006.01) |
| *H04B 10/27* | (2013.01) |
| *H04B 10/61* | (2013.01) |
| *H04B 10/50* | (2013.01) |
| *H04B 10/40* | (2013.01) |
| *H04B 10/272* | (2013.01) |
| *H04B 10/516* | (2013.01) |
| *H04B 10/2507* | (2013.01) |
| *H04B 10/2513* | (2013.01) |

(52) U.S. Cl.
CPC ............... *H04B 10/27* (2013.01); *H04B 10/61* (2013.01); *H04B 10/50* (2013.01); *H04B 10/40* (2013.01); *H04B 10/2507* (2013.01); *H04B 10/25137* (2013.01); *H04B 10/272* (2013.01); *H04B 10/516* (2013.01); *H04B 10/613* (2013.01); *H04B 10/616* (2013.01)

(58) Field of Classification Search
CPC .................................................. H04B 2210/254
See application file for complete search history.

(56) References Cited

U.S. PATENT DOCUMENTS

| 2009/0060521 | A1* | 3/2009 | Lin et al. ......................... 398/140 |
| 2010/0054740 | A1* | 3/2010 | Lee et al. ......................... 398/68 |

(Continued)

OTHER PUBLICATIONS

Zibar et al., DSP based Coherent Reciever for Phase-Modulated Radio-over-Fiber Optical Links, 2008, Optical Society of America, pp. 1-3.*

(Continued)

*Primary Examiner* — Ken Vanderpuye
*Assistant Examiner* — Jai Lee
(74) *Attorney, Agent, or Firm* — Joseph Kolodka

(57) ABSTRACT

An optical access network with centralized digital optical line termination OLT including an optical line termination unit having a digital transmitter and a coherent receiver for downstream signal transmitting and upstream signal receiving, and at least one optical network unit ONU with transceiver functions for communicating with the OLT over an optical path, the ONU including intensity modulation and single photodiode detection, wherein the digital transmitter includes digital signal processing DSP, digital-to-analog conversion DAC and analog-to-digital conversion ADC functions that can be shared by all multiple ones of the ONU in the network, the DSP reducing or removing dispersion and non-linearity effects in the network and the coherent receiver enabling performance of the downstream stream signal transmitting to match that of the upstream signal receiving in the OLT.

8 Claims, 3 Drawing Sheets

(56) References Cited

U.S. PATENT DOCUMENTS

2010/0247099 A1* 9/2010 Lowery et al. .................. 398/79
2011/0129230 A1* 6/2011 Zanoni et al. .................. 398/140
2012/0148262 A1* 6/2012 Awadalla et al. ............. 398/193

OTHER PUBLICATIONS

Tang et al., Optimum Design for RF-to-Optical Up-Converter in Coherent Optical OFDM Systems, 2007, IEEE, p. 483.*

Cvijetic et al., 1.2 Tb/s Symmetric WDM-OFDMA-PON over 90km Straight SSMF and 1:32 Passive Split with Digitally-Selective ONUs and Coherent Receiver OLT, 2011, Optical Society of America, pp. 1-3.*

DeCusatis et al., the Optical Communications Reference, 2010, Elsevier Ltd., p. 336.*

Wei et al., Wavelength reused bidirectional transmission of adaptively modulated optical OFDM signals in WDM-PONs incorporating SOA and RSOA intensity modulators, Apr. 2010, Optical Society of America, pp. 9792-9795.*

* cited by examiner

NEXT GENERATION OPTICAL ACCESS NETWORK WITH CENTRALIZED DIGITAL OLT

RELATED APPLICATION INFORMATION

This application claims priority to provisional application No. 61/599,696 filed Feb. 16, 2012, the contents thereof are incorporated herein by reference

BACKGROUND OF THE INVENTION

The present invention relates generally to optical networks, and more particularly, to an optical access network with centralized digital optical line termination OLT.

For future optical access networks, there are several architectures under discussion including TDM-PON, WDM-PON, OFDMA-PON and their combinations. Each of them has both pros and cons.

TDM-PON is a simple architecture which uses passive optical splitter to distribute downstream signal to all the optical network unit ONU. At the ONU receiver, all the downstream signals are received and only the data to the desired ONU would be demodulated and forward to the user. For the upstream signal, all ONUs share the same wavelength in different time slots. The schedule of the upstream time slots would be pre-determined by the OLT and broadcasted to all ONUs at the beginning of each scheduling cycle. Time division multiplexing—passive optical network TDM-PON is a low-cost and passive architecture. The deployment is also easy. On the other hand, TDM-PON request burst-mode receiver at the OLT side because of the laser on/off time. Another issue of TDM-PON is the lack of capability for higher data rate (>10 Gb/s) and longer reach (20~100 km) because of the dispersion, cost/complexity and burst-mode receiver development.

Wave division multiplexing—passive optical networks WDM-PONs use different wavelengths (WDM) for multiple ONUs. Because each ONU has its own wavelength, its downstream and upstream signals can be transmitter independently from other ONUs without generating or receiving any distortion. The challenges of WDM-PON is to use multiple wavelengths in a single system which request multiple transceivers at the OLT. Usually this will increase the cost and system complexity. The difficulty of the deployment will also been increased. Another issue of WDM-PON is the lack of flexibility and it can not share data bandwidth among all ONUs.

Orthogonal frequency division multiplexing—passive optical network OFDMA-PON is a new proposed architecture for next generation optical access networks. Different ONUs can either share the same wavelength or use multiple wavelengths (WDM) for the signal transmission. The major difference is to use OFDMA technologies for multiple access communication. OFDM technology modulate signal on different sub-carriers. When multiple ONUs transmit simultaneously at different sub-carriers. Because all the sub-carriers are orthogonal to each other. There is not any distortion among all ONUs when they transmit at the same time. Due to the OFDM technology, the OFDMA-PON has better Chromatic dispersion tolerance and can be used for long reach PON without any dispersion penalty. However, OFDM technologies request high bandwidth DAC/ADC and high speed DSP modules in the transceiver at both OLT and ONU. This will significantly increase the cost of the whole system.

Accordingly, there is a need for a next generation optical access network with centralized digital OLT.

BRIEF SUMMARY OF THE INVENTION

The present invention is directed to an optical access network with centralized digital optical line termination OLT including an optical line termination unit having a digital transmitter and a coherent receiver for downstream signal transmitting and upstream signal receiving, and at least one optical network unit ONU with transceiver functions for communicating with the OLT over an optical path, the ONU including intensity modulation and single photodiode detection, wherein the digital transmitter includes digital signal processing DSP, digital-to-analog conversion DAC and analog-to-digital conversion ADC functions that can be shared by all multiple ones of the ONU in the network, the DSP reducing or removing dispersion and non-linearity effects in the network and the coherent receiver enabling performance of the downstream stream signal transmitting to match that of the upstream signal receiving in the OLT.

In an alternative expression of the invention, a method by an optical access network with centralized digital optical line termination OLT includes providing an optical line termination unit having a digital transmitter and a coherent receiver for downstream signal transmitting and upstream signal receiving, and communicating, with at least one optical network unit ONU with transceiver functions, with the OLT over an optical path a least one optical network unit with transceiver functions, the ONU including intensity modulation and single photodiode detection, wherein the digital transmitter includes digital signal processing DSP, digital-to-analog conversion DAC and analog-to-digital conversion ADC functions that can be shared by all multiple ones of the ONU in the network, the DSP reducing or removing dispersion and non-linearity effects in the network and the coherent receiver enabling performance of the downstream stream signal transmitting to match that of the upstream signal receiving in the OLT.

These and other advantages of the invention will be apparent to those of ordinary skill in the art by reference to the following detailed description and the accompanying drawings.

DETAILED DESCRIPTION

The present invention is directed to a novel PON architecture that can combine the simplicity of a TDM-PON and powerful flexibility of a DSP feature from an OFDMA-PON. A centralized DSP OLT is employed so that both the digital transmitter and coherent receiver are used in the OLT for the downstream signal transmitting and upstream signal receiving. At the ONU side, both transmitter and receiver are still using an analog system for intensity modulation and single photo-diode power detection. Using this network configuration, the powerful and flexible DSP feature is fully implemented at the OLT so that the high cost from the digital-to-analog-converter/analog-to-digital-converter DAC/ADC and digital signal processing DSP function can be shared by all the ONUs. On the other hand, the simple transceivers at the ONUs can maintain the total system cost low.

Figure 1:
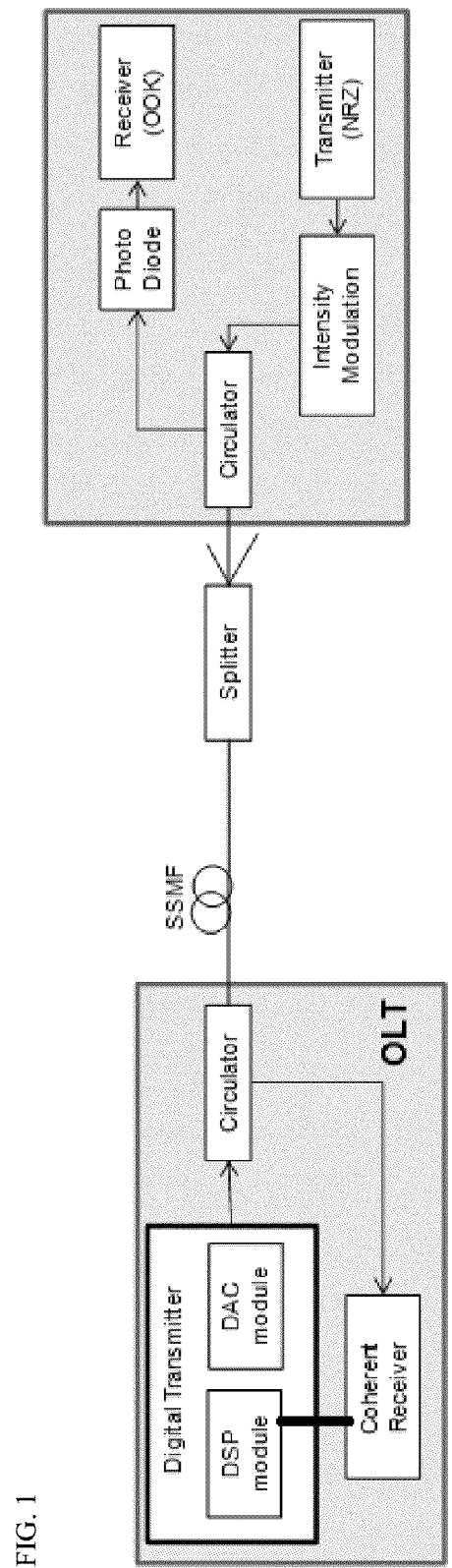
FIG. 1 is a diagram of a passive optical network with centralized digital signal processing DSP OLT, in accordance with the invention.

Turning now to the block diagram of FIG. 1, there is shown an exemplary configuration of an inventive PON with a centralized digital signal processing optical line termination DSP OLT. An optical line termination coupled over a standard-single-mode-fiber SSMF and splitter to an optical network unit ONU. The ONU includes a circulator, intensity modulator, a nonreturn-to-zero NRZ transmitter and an on/off-keying OOK receiver. Inside the OLT, a transmitter includes both a digital signal processor component and a digital-to-analog-convert DAC component. A coherent receiver is used for the OLT.

Figure 2:
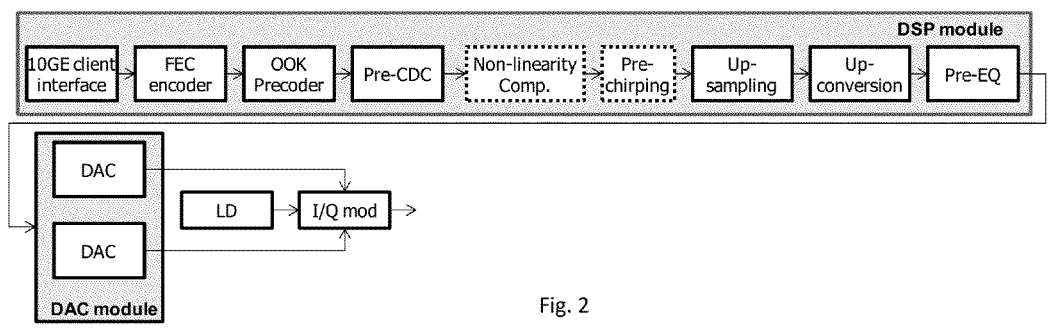
FIG. 2 is details the digital transmitter block in the OLT shown in FIG. 1.

Turning now to the FIG. 2, there is shown an exemplary diagram of the digital transmitter inside the OLT of FIG. 1. The digital transmitter in the OLT has multiple DSP functions shown in block indicated DSP module. A client interface is coupled to a forward error correction FEC, on/off-keying component, a pre-colorless, directionless, contentionless CDC component, forward non-linearity compensation, pre-chirping, up-sampling, up-conversion and pre-equalization. The output of the DSP component is sent to a digital-to-analog converter DAC component to be converted to an analog signal which will be used to drive the I/Q modulator fed by a laser diode LD as shown in FIG. 2.

Figure 3:
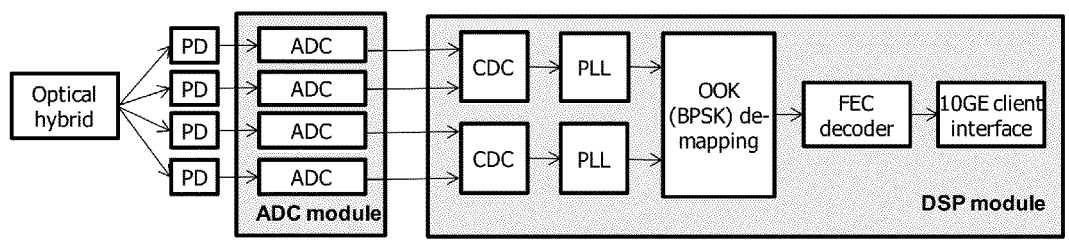
FIG. 3 details the coherent receiver in the OLT shown in FIG. 1.

Turning now to FIG. 3, there is shown a diagram of the digital coherent receiver inside the OLT of FIG. 1. The digital coherent receiver in the OLT contains an optical receiver part and electrical receiver part. In the optical part, there are an optical hybrid and photodiode PD array for four channels. The electrical part includes an ADC and DSP components. The major DSP functions in the module are a colorless, directionless contentionless CDC component, a Phase lock loop (PLL), an OOK (BPSK) de-mapping component and an FEC decoder and a 10 Gigabit Ethernet (10 GE) client interface.

Figure 4:
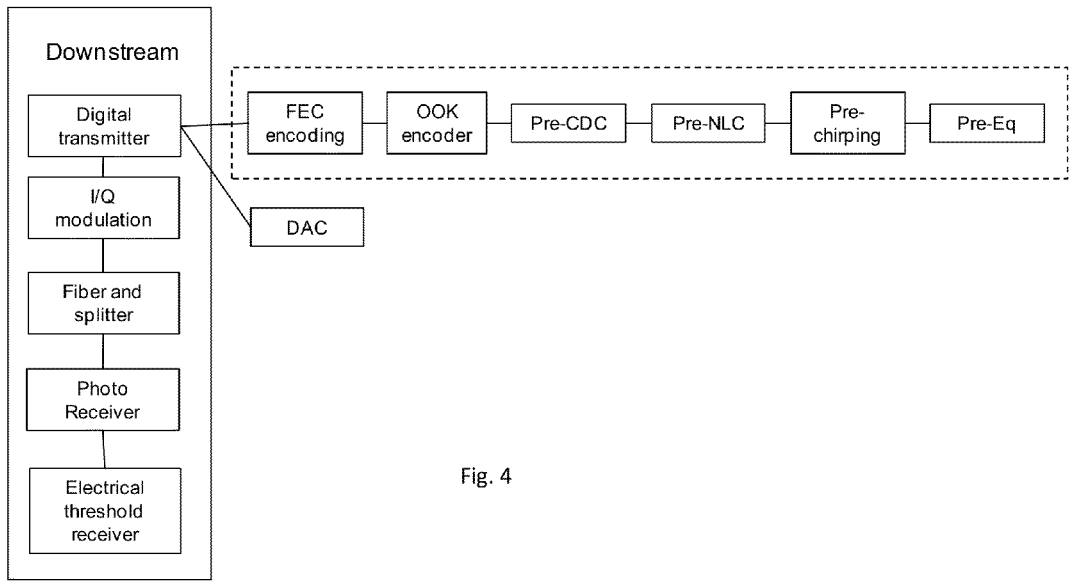
FIG. 4 is a flow diagram of downstream link in the network shown in FIG. 1.

Turning now to FIG. 4, there is shown a flow diagram of the downstream link sequence in the network of FIG. 1. The crucial digital transmitter outputs to the DSP and DAC paths. The DSP performs forward error correction, on/off-key encoding, pre-colorless directionless contentionless CDC, pre-nonlinearity compensation, pre-chirping and pre-equalization functions. The digital transmitter output is also I/Q modulated and sent over the fiber/splitter path where it is then photo received and the processed by an electrical threshold receiver.

Figure 5:
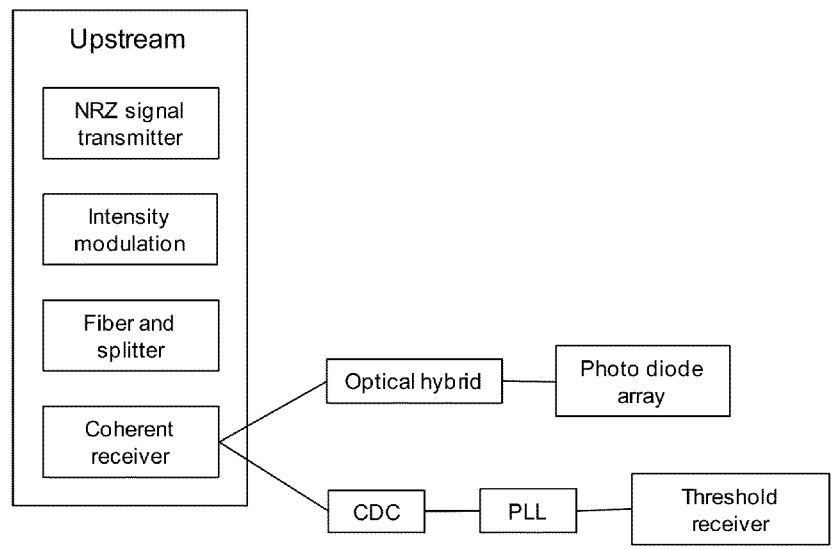
FIG. 5 is a flow diagram of upstream link in the network shown in FIG. 1.

Turning now to FIG. 5, there is a shown a flow diagram of the upstream link sequence in the network of FIG. 1. The NRZ signal transmitter outputs to an intensity modulator which outputs over a fiber/splitter path to a coherent receiver. The coherent receiver in the digital transmitter in the OLT includes optical hybrid and photo diode array functions on one path and CDC, phase lock loop and threshold receiving functions in another path.

The digital transceiver in the OLT and analog transceiver in the ONU are new and different from techniques proposed by others heretofore. Prior solutions use either analog or digital transceiver for both OLT and ONU.

The coherent receiver has been well known for the performance improvement. It is acceptable to use coherent receiver in the OLT for the upstream signal receiving so that the cost can be shared by all the users. However, in order to match the upstream performance, downstream performance has to be improved from current analog system. This improvement is usually not easy without DSP capability. However, to implement the coherent receiver in all the ONUs is too expensive which is lack of attraction from the carrier. The proposed digital transmitter architecture solve this problem with minimum cost increase. The dispersion penalty and non-linearity penalty can be both removed or reduced use the DSP function. Therefore, the downstream performance can match the upstream performance using coherent receiver.

From the foregoing, it can be appreciated that the inventive optical access network with centralized digital OLT can either be used to upgrade current 10 G-PON systems or to deploy a new beyond 10 G PON system. The DSP capability can make sure the dispersion penalty is negligible by adding chromatic dispersion CD compensation. Non-linearity compensation can also be implemented to increase the path loss tolerance. Both these features can increase the PON's distance like long-reach-PON or larger splitting ratio like 1:128. The simple ONU can still maintain the total cost of the system very low.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. An optical access network with centralized digital optical line termination OLT comprising:
   an optical line termination (OLT) unit having a digital transmitter and a coherent receiver for downstream signal transmitting and upstream signal receiving; and
   at least one optical network unit ONU with transceiver functions for communicating with said OLT unit over an optical path, said ONU including an analog transceiver with intensity modulation and single photodiode detection;
   wherein said digital transmitter includes digital signal processing DSP module, digital-to-analog conversion DAC module, and the coherent receiver in the DSP module that can be shared by one or more of said ONUs in said network, said DSP module reducing or removing dispersion and non-linearity effects in said network and said coherent receiver enabling performance of said downstream stream signal transmitting to match that of said upstream signal receiving in said OLT, said coherent receiver having a plurality of ADCs coupled to a Colorless, Directionless, Contentionless (CDC) communicating with a phase locked loop and to an on-off keying OOK demapper.

2. The network of claim 1, wherein said DSP comprises a client interface coupled to a forward error correction FEC, on/off-keying component, a pre-colorless directionless, contentionless CDC component, a forward non-linearity compensation, a pre-chirping, an up-sampling, an up-conversion and a pre-equalization.

3. The network of claim 1, wherein said coherent receiver comprises an optical hybrid coupled to photo-detection array for respective outputs from said optical hybrid and providing inputs to respective ADC components that output to said DSP.

4. The network of claim 1, wherein said DSP comprises an array of colorless directionless contentionless CDC components coupled to respective phase lock loops that output to an on/off-keying de-mapping, said de-mapping coupled to a forward error correction followed by a client interface.

5. A method by an optical access network with centralized digital optical line termination COLT) comprising the steps of:
providing an optical line termination unit having a digital transmitter and a coherent receiver for downstream signal transmitting and upstream signal receiving; and
communicating, with at least one optical network unit ONU with an analog transceiver functions, with said OLT unit over an optical path a least one optical network unit with transceiver functions for, said ONU including an analog transceiver with intensity modulation and single photodiode detection;
wherein said digital transmitter includes digital signal processing DSP module, digital-to-analog conversion DAC module and analog-to-digital conversion ADC functions that can be shared by all multiple ones of said ONU in said network, said DSP module client interface coupled to a forward error correction FEC, on/off-keying component, a pre-colorless, directionless, contentionless (CDC) component, forward non-linearity compensation, pre-chirping, up-sampling, up-conversion and pre-equalization, said DSP module reducing or removing dispersion and non-linearity effects in said network and said coherent receiver enabling performance of said downstream stream signal transmitting to match that of said upstream signal receiving in said OLT, said coherent receiver having a plurality of ADCs coupled to a CDC communicating with a phase locked loop and to an on-off keying OOK demapper.

6. The method of claim 5, wherein said DSP comprises a client interface coupled to a forward error correction FEC, on/off-keying component, a pre-colorless directionless, contentionless CDC component, a forward non-linearity compensation, a pre-chirping, an up-sampling, an up-conversion and a pre-equalization.

7. The method of claim 5, wherein said coherent receiver comprises an optical hybrid coupled to photo-detection array for respective outputs from said optical hybrid and providing inputs to respective ADC components that output to said DSP.

8. The method of claim 5, wherein said DSP comprises an array of colorless directionless contentionless CDC components coupled to respective phase lock loops that output to an on/off-keying de-mapping, said de-mapping coupled to a forward error correction followed by a client interface.

\* \* \* \* \*